(12) United States Patent
Kerber et al.

(10) Patent No.: US 10,328,914 B2
(45) Date of Patent: Jun. 25, 2019

(54) METHOD FOR SETTING A SLIP THRESHOLD AND VEHICLE MOVEMENT DYNAMICS CONTROL DEVICE

(71) Applicant: Continental Teves AG & Co. oHG, Frankfurt (DE)

(72) Inventors: Henning Kerber, Darmstadt (DE); Manuel Kasten, Hattersheim (DE); Mario Roszyk, Wehrheim (DE); Dieter Burkhard, Bingen-Büdesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 175 days.

(21) Appl. No.: 15/354,175

(22) Filed: Nov. 17, 2016

(65) Prior Publication Data

US 2017/0066422 A1    Mar. 9, 2017

Related U.S. Application Data

(63) Continuation of application No. PCT/EP2015/057895, filed on Apr. 10, 2015.

(30) Foreign Application Priority Data

May 27, 2014   (DE) .................. 10 2014 210 062

(51) Int. Cl.
| | | |
|---|---|---|
| *B60W 30/18* | (2012.01) | |
| *B60W 50/00* | (2006.01) | |
| *B60T 8/1755* | (2006.01) | |
| *B60T 8/1761* | (2006.01) | |

(52) U.S. Cl.
CPC .......... *B60T 8/1755* (2013.01); *B60T 8/1761* (2013.01); *B60W 30/18109* (2013.01);
(Continued)

(58) Field of Classification Search
CPC ........... B60T 8/1761; B60W 30/18109; B60W 30/18145; B60W 50/0098
(Continued)

(56) References Cited

U.S. PATENT DOCUMENTS

| 5,685,618 A | 11/1997 | Uchida et al. |
|---|---|---|
| 5,884,987 A | 3/1999 | Kawabe et al. |

(Continued)

FOREIGN PATENT DOCUMENTS

| CN | 1148017 A | 4/1997 |
|---|---|---|
| CN | 1814482 A | 8/2006 |

(Continued)

OTHER PUBLICATIONS

International Search Report and Written Opinion dated Sep. 11, 2015 from corresponding International Patent Application No. PCT/EP2015/057895.
(Continued)

*Primary Examiner* — Maceeh Anwari

(57) ABSTRACT

A method for setting a slip threshold for a vehicle movement dynamics control device of a motor vehicle is provided. The method includes defining a slip threshold starting from which the vehicle movement dynamics control device is activated in order to reduce slip, and determining wheel-specific minimum slip values for the wheels of the motor vehicle, which slip values are derived from the respective wheel-specific slip signals. The method also includes detecting a geometric slip by correlating all the determined wheel-specific minimum slip values with one another, and evaluating the wheel-specific minimum slip values that are correlated with one another. The method also includes raising the slip threshold in the event of geometric slip being detected. The present disclosure also relates to a vehicle movement dynamics control device.

15 Claims, 3 Drawing Sheets

(52) U.S. Cl.
CPC .. *B60W 30/18145* (2013.01); *B60W 50/0098* (2013.01); *B60T 2201/16* (2013.01); *B60T 2210/24* (2013.01); *B60T 2250/03* (2013.01); *B60W 2050/0075* (2013.01); *B60W 2520/26* (2013.01); *B60W 2520/28* (2013.01)

(58) Field of Classification Search
USPC .......................................................... 701/71
See application file for complete search history.

(56) References Cited

U.S. PATENT DOCUMENTS

| | | | |
|---|---|---|---|
| 2003/0176961 | A1 | 9/2003 | Sauter et al. |
| 2015/0191158 | A1 | 7/2015 | Vorreiter |

FOREIGN PATENT DOCUMENTS

| | | | |
|---|---|---|---|
| DE | 19910099 | A1 | 11/1999 |
| DE | 19936786 | A1 | 11/2000 |
| DE | 19958772 | A1 | 6/2001 |
| DE | 10160069 | A1 * | 9/2002 |
| DE | 10160069 | A1 | 9/2002 |
| DE | 10154425 | A1 | 5/2003 |
| DE | 10238221 | A1 | 10/2003 |
| DE | 102009022302 | A1 | 11/2010 |
| DE | 102012012475 | A1 | 12/2013 |
| WO | WO9950114 | A1 | 10/1999 |
| WO | WO0009376 | A1 | 2/2000 |

OTHER PUBLICATIONS

Search Report dated Mar. 17, 2015 for corresponding German Patent Application No. DE 10 2014 210 062.3.
Debes M et al: "Dynamische Stabilitaets Control DSC Der Baureihe 7 Von BMV -TEIL 1", ATZ Automobiltechnische Zeitschrift, Vieweg Publishing, Wiesbaden, Germany, Bd. 99, Nr. 3, Mar. 1, 1997, pp. 134-136, 138, XP000682345, ISSN: 0001-2785, p. 2.
China Office Action dated Jun. 12, 2018 for corresponding Chinese Patent Application No. 201580027598.6.

* cited by examiner

METHOD FOR SETTING A SLIP THRESHOLD AND VEHICLE MOVEMENT DYNAMICS CONTROL DEVICE

CROSS REFERENCE TO RELATED APPLICATIONS

This U.S. patent application claims the benefit of PCT patent application No. PCT/EP2015/057895, filed Apr. 10, 2015, which claims the benefit of German patent application No. 10 2014 210 062.3, filed May 27, 2014, both of which are hereby incorporated by reference.

TECHNICAL FIELD

The present disclosure relates to a method for setting a slip threshold for a vehicle movement dynamics control device of a motor vehicle and to a vehicle movement dynamics control device.

TECHNICAL BACKGROUND

Modern motor vehicles have driver assistance systems which assist the driver in various driving situations by actively intervening in the control of the vehicle in situations in which the stability of the vehicle is at risk. The driver assistance systems include inter alia devices for controlling the vehicle movement dynamics, which are also referred to as electronic stability control (ESC) or an electronic stability program (ESP). In this context, ESP extends and links the known anti-lock brake system (ABS) with traction control (TC) and electronic braking force distribution. The traction control ensures that one or more wheels of a motor vehicle do not spin during acceleration and when the adhesive friction is at the same time low, e.g., in the case of a slippery underlying surface, wet underlying surface etc.

A characteristic variable that constitutes an important characteristic variable for vehicle movement dynamics control is what is referred to as the wheel slip. The wheel slip denotes the ratio between the distance actually traveled per rotation of the wheel and the actual circumference of the wheel. In the case of a low slip, the wheels grip the coating of the underlying surface very well and can therefore move the vehicle. Conversely, a high slip characterizes situations in which the wheels no longer have complete contact with the underlying surface. The locking of the wheels as a result of a high braking slip and the spinning of the wheels is therefore characterized by high drive slip. It is necessary to avoid excessive braking slip and drive slip, since they can bring about undesired instability of the motor vehicle.

Known anti-lock brake systems compare a measured wheel speed with an estimated vehicle reference speed and calculate therefrom the absolute wheel slip S_abs or the relative wheel slip S_rel, as shown in equations 1 and 2:

$$S\_abs = V\_Veh + V\_Wh \quad (1)$$

$$S\_rel = (V\_Veh - V\_Wh)/V\_Veh \quad (2)$$

In addition to the conventional braking slip, in which the wheels tend to lock as a result of excessively strong braking, calculated slip can also occur when the motor vehicle is moving along a curved path. In this case, the individual wheels rotate at different speeds solely as a result of their different curve radiuses. Therefore, wheel-specific slip occurs which is induced by a curve radius and which is dependent on the position of the wheel on the motor vehicle. This slip is referred to, at least in this patent application, as geometric slip. The geometric slip is based inter alia on the following effects:

1. The wheels of the motor vehicle on the outside of the bend move on a larger curve radius than the wheels on the inside of the bend and therefore travel a larger distance in the same time. This brings about a higher wheel speed of the wheels on the outside of the bend.

2. The wheels of the non-steered rear axle move along a tighter curve radius and therefore more slowly than the wheels on the steered front axle. This effect is all the more serious in the case of very small curve radiuses and/or at relatively low vehicle velocities.

3. Owing to centrifugal forces, higher wheel loads act on the wheels on the outside of the bend than on the wheels on the inside of the bend, as a result of which the dynamic wheel radius becomes smaller. As a result of this at a specific velocity the wheels rotate at an increased rotational speed. However, since the ABS device does not determine the actual wheel speed on the basis of the distance traveled but instead determines the wheel speed only indirectly by means of the rotational speed of the wheel, the wheel speeds which are determined by the ABS device are higher at the wheels on the outside of the bend than at the wheels on the inside of the bend.

In specific driving situations, in particular when the velocity is very low and there are tight bends, this difference in speed between the wheels on the outside of the bend and the wheels on the inside of the bend can assume orders of magnitude of up to 6 km/h. This effect should therefore not be neglected, in particular when configuring the slip threshold at low speeds. Otherwise, when traveling around a bend at a low velocity the wheels on the inside of the bend would rotate more slowly, solely owing to the travel around the bend, to such an extent that the ABS control is actuated without an ABS-relevant event actually occurring. In order to avoid this situation, there is now the possibility of configuring the slip threshold with a correspondingly high value. However, this more robust configuration of the slip thresholds contradicts the need for ABS control to be as sensitive as possible.

In this respect, there is the need to differentiate the situation of "straight-ahead travel" from "travel around a bend" (geometric slip) when configuring the slip thresholds. By using a suitable additional sensor system, for example a yaw rate sensor, lateral acceleration sensor, steering sensor, etc., given knowledge of the vehicle geometry it will be possible to calculate very precisely the difference in speed caused by the travel around the bend. It is problematic if such an additional sensor system is not available or is, for example, defective.

SUMMARY

Therefore, it is desirable to make available a simple and reliable possible way of setting the slip threshold in the case of geometric slip by way of a method and/or by way of a vehicle movement dynamics control device.

One aspect of the disclosure provides a method for setting a slip threshold for a vehicle movement dynamics control device of a motor vehicle. The method includes predefining a slip threshold starting from which the vehicle movement dynamics control device is activated to reduce the slip and determining wheel-specific minimum slip values for the wheels of the motor vehicle, which values are derived from respective wheel-specific slip signals. The method also includes detecting a geometric slip by correlating all the determined wheel-specific minimum slip values with one another and by evaluating the wheel-specific minimum slip values which are correlated with one another; and raising the slip threshold when geometric slip is detected.

Another aspect of the disclosure provides a vehicle movement dynamics control device in or for a motor vehicle which has a plurality of wheels which can be controlled individually, having a brake slip control apparatus, which is designed to carry out an method for setting the slip thresholds.

The concept on which the present disclosure is based consists of, on the one hand, selectively raising the respective slip thresholds depending on the driving situation (straight-ahead travel, travel around a bend). On the other hand, this selective raising of the slip thresholds is performed only in situations in which what is referred to as geometric slip also actually occurs. The selective raising of the slip thresholds takes place in a very simple way directly on the basis of measured wheel signals which are determined from the wheel speeds. Therefore, the method according to the disclosure does not require the provision of an additional sensor system for determining the yaw rate, lateral acceleration, steering lock angle lock and the like.

In the method according to the disclosure, a wheel-specific slip offset is calculated for the determination of the slip threshold from a comparison of the measured wheel signals of all the wheels for each of these wheels. In this context, the determined wheel signals are correlated with the corresponding wheel signals of the other wheels. Comparing the corresponding wheel signals of different wheels with one another reduces the probability of an error. At the same time, in this way the slip threshold can be determined as precisely as possible when geometric slip is detected.

Advantageous implementations and developments can be found in the further dependent claims and the description with reference to the figures of the drawing.

In some implementations, in the step of raising the slip threshold, the latter is raised individually for each wheel of the vehicle. For example, the slip threshold is raised in accordance with the wheel-specific minimum slip value determined for the respective wheel.

When geometric slip is detected, the slip threshold is preferably raised at least by the value of the determined wheel-specific minimum slip value. A slightly higher value for the slip threshold than the determined minimum slip value is appropriate and advantageous so that the anti-lock brake control does not intervene prematurely in a controlling fashion. However, in principle it would also be conceivable if, in the case of geometric slip being detected, the slip threshold were to be raised by a value which is slightly smaller than the determined wheel-specific minimum slip value. As a result, the anti-lock brake control would be configured in a very sensitive way and would therefore be triggered very early, e.g. just before the occurrence of slip.

It is also advantageous if in the step of raising the slip threshold a maximum predefined slip value is not exceeded. In this way, it is ensured that a safety-critical slip threshold starting from which the motor vehicle risks becoming unstable is never overshot. This predefined maximum slip value can be estimated, for example. Alternatively, this maximum slip value can be derived on a situation-dependent basis from a permissible lateral acceleration, a current vehicle velocity, a velocity-dependent maximum curve radius, a yaw rate or the like.

In some implementations, a wheel-specific slip signal is generated for a respective wheel of the motor vehicle by virtue of the fact that the difference between a measured current wheel speed for the respective wheel and a reference speed is continuously calculated. The reference speed can be derived, for example, from the wheel speeds measured at all the wheels. For example, the respectively highest measured speed of a wheel can be used as the reference speed. For the calculation of the slip, the wheel speeds that are determined in this way for the individual wheels are compared with this reference speed.

In some examples, while determining wheel-specific minimum slip values a minimum-value-determining process is performed. For this purpose, for a predefined time period a minimum signal value of the wheel-specific slip signal assigned to a respective wheel is determined. This minimum signal value which is determined in this way is then used as a wheel-specific minimum slip value for this wheel. For this minimum-value-determining process a plurality of methods can be considered, such as, for example, the use of a drag pointer or of a chronologically asymmetrical low-pass filter. When a chronologically asymmetrical low-pass filter is used there is advantageously the possibility of being able to adapt the filter constants to the respective driving situation when configuring the filter. In this way, it is possible, for example, to strengthen the filtering effect if the currently determined slip is, for example, not geometric slip but instead dynamic braking slip. In addition to the abovementioned drag pointers or low-pass filters for the minimum-value-determining process it is, of course, also possible to use other more or less complex methods for determining or measuring the effective value, peak value etc.

In some implementations, during the evaluation of the wheel-specific minimum slip values that are correlated with one another it is assumed that geometric slip always occurs simultaneously at a plurality of wheels of the motor vehicle. For example, such geometric slip usually occurs simultaneously at wheels on the same side of the vehicle and, in particular, on the respective wheels on the inside of the bend. Additionally or alternatively, during this evaluation it is assumed that the wheel-specific geometric slip is approximately or equal to zero at least one wheel and, in particular, at a wheel on the respective other side of the vehicle or the side of the vehicle on the outside of the bend. As a result, it is possible to check the plausibility as to whether the determined wheel-specific slip actually represents the geometric slip or has been caused by other effects, e.g., by strong braking or drifting.

In some implementations, during the evaluation of the wheel-specific minimum slip values which are correlated with one another it is assumed that given the presence of geometric slip the wheel-specific minimum slip value of a rear axle wheel is higher than the respective wheel-specific minimum slip value of a respective front-axle wheel, in each case related to the same side of the vehicle.

The method according to the disclosure is particularly preferable at low vehicle velocities. For example, the method according to the disclosure is advantageous at vehicle velocities of less than 50 km/h, such as, for example, at velocities of less than 25 km/h. The method according to the disclosure is particularly preferred at very low velocities in the region of less than 10 km/h, since here the percentage deviation of the wheel speeds of the various wheels from one another is greatest.

The method according to the disclosure and here, in particular, the method steps V2 to V4 are used in some examples only in the case of positive braking slip and/or travel around a bend. Positive braking slip refers to a driving situation in which active braking takes place.

In some implementations, the slip threshold is again reset to the predefined slip threshold as soon as no geometric slip is occurring any more.

In some examples, the vehicle movement dynamics control device is a component of an ABS device or of a traction control device.

The implementations and examples may, where appropriate, be combined with one another as desired. Further possible implementations and examples of the disclosure also include non-explicitly specified combinations of features of the disclosure which have been described above or are described below with respect to the exemplary implementations. In particular, in this context the person skilled in the art will also add individual aspects as improvements or additions to the respective basic form of the present disclosure.

DESCRIPTION OF DRAWINGS

The present disclosure will be explained in more detail below with respect to the schematic figures of the drawings, in which.

Figure 1:
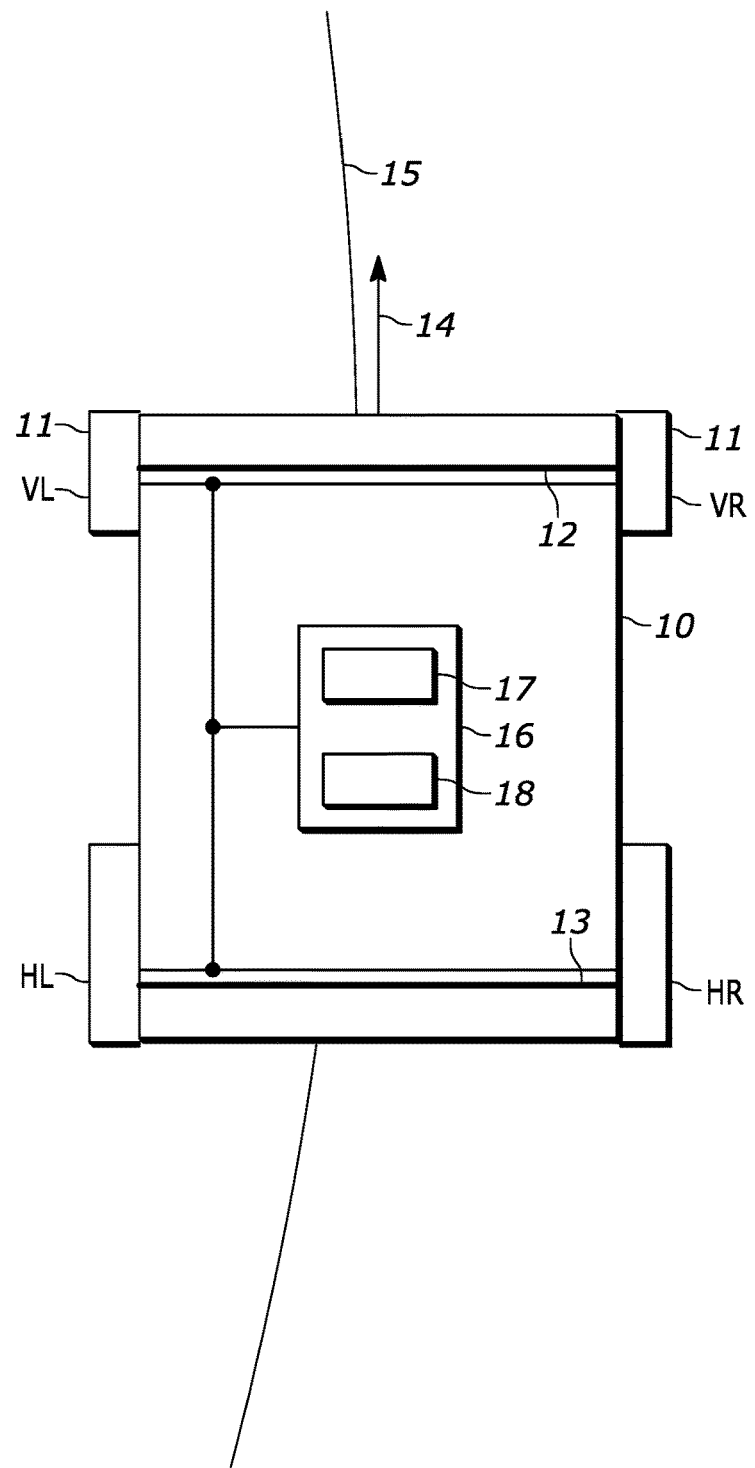
FIG. 1 shows a block diagram of a motor vehicle having a vehicle movement dynamics control device.

The drawings are intended to permit better understanding of the disclosure. They illustrate examples and serve, in conjunction with the description, to explain principles and concepts of the disclosure. Other examples and implementations and many of the specified advantages become apparent from the drawings. The elements of the drawings are not necessarily shown true to scale with respect to one another.

In the figures of the drawing, identical, functionally identical and identically acting elements, features and components are, unless stated otherwise, respectively provided with the same reference symbols.

DETAILED DESCRIPTION

FIG. 1 shows a block circuit diagram of a motor vehicle that is equipped with a vehicle movement dynamics control device according to the disclosure. The motor vehicle, which is denoted here by reference symbol 10, includes four wheels 11, wherein in each case two wheels 11 are attached to the steered front axle 12, and in each case two wheels 11 are attached to the non-steered rear axle 13. FL and FR denote the left and right front wheels, and RL and RR denote the respective wheels on the left and right of the rear axle. It is assumed that the motor vehicle 10 is moving in the direction of travel 14 along a curved path 15. In this state, the wheels FL, RL form the wheels on the inside of the bend, and the wheels FR, RR form the wheels on the outside of the bend.

The motor vehicle 10 also has a vehicle movement dynamics control device 16 according to the disclosure, which vehicle movement dynamics control device 16 can be embodied, for example, as an ESP and for this purpose includes an anti-lock brake system 17 and a traction control system 18. For this purpose, the vehicle movement dynamics control device 16 is respectively coupled to the wheels 11. The method of functioning of the vehicle movement dynamics control device 16 will be explained in more detail below with reference to FIGS. 2 and 3.

The various wheels 11 are driven via at least one of the axles 12, 13 and braked by means of the respective brake devices (not illustrated here). Each of the wheels 11 is additionally assigned a rotational speed sensor (not illustrated here) which determines the rotational speed and therefore the respective wheel speed of the corresponding wheel 11. During travel, these rotational speed sensors monitor, together with the vehicle movement dynamics control device 16, the slip behavior of the various wheels 11, that is to say both the braking slip and the drive slip.

Figure 2:
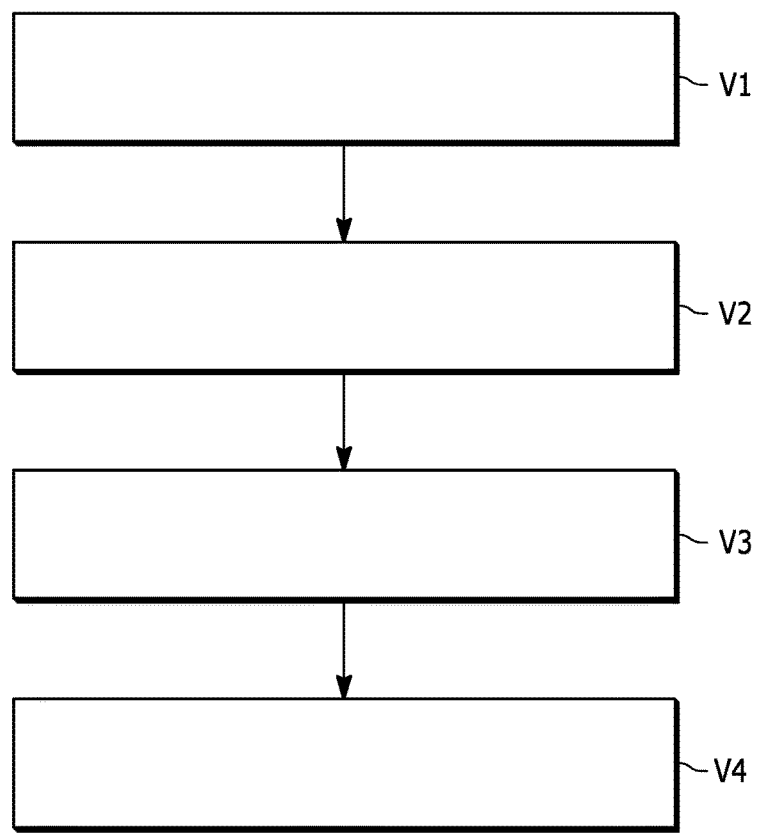
FIG. 2 shows a flowchart explaining a first general example of the method for setting a slip threshold for a vehicle movement dynamics control device.

FIG. 2 shows a flowchart explaining an example of the method for setting a slip threshold for a vehicle movement dynamics control device of a motor vehicle.

In a first step V1, a general slip threshold starting from which the vehicle movement dynamics control device is activated in order to reduce the conventional slip which is occurring is predefined.

Subsequently, in a further step V2 wheel-specific minimum slip values for the wheels of the motor vehicle are determined, which minimum slip values are derived from respective wheel-specific slip signals. For this purpose, firstly the wheel-specific slip signals are calculated (e.g. by means of a comparison of the measured wheel speeds with the vehicle reference speed) and then the wheel-specific minimum slip values are determined from these wheel-specific slip signals.

In a third step V3 the presence of geometric slip is detected. Geometric slip is understood to be slip during which the slip value of the respective wheel depends on the installation position of the respective wheel on the motor vehicle. In the case of geometric slip, the respective wheel-specific slip signals are therefore different depending on the installation position of the respective wheel. The detection of the geometric slip is carried out here by correlating all the determined wheel-specific minimum slip values with one another. Subsequently, the wheel-specific minimum slip values which are correlated with one another in this way are evaluated.

In the case when geometric slip is detected, the slip threshold is correspondingly raised in a fourth step V4.

Figure 3:
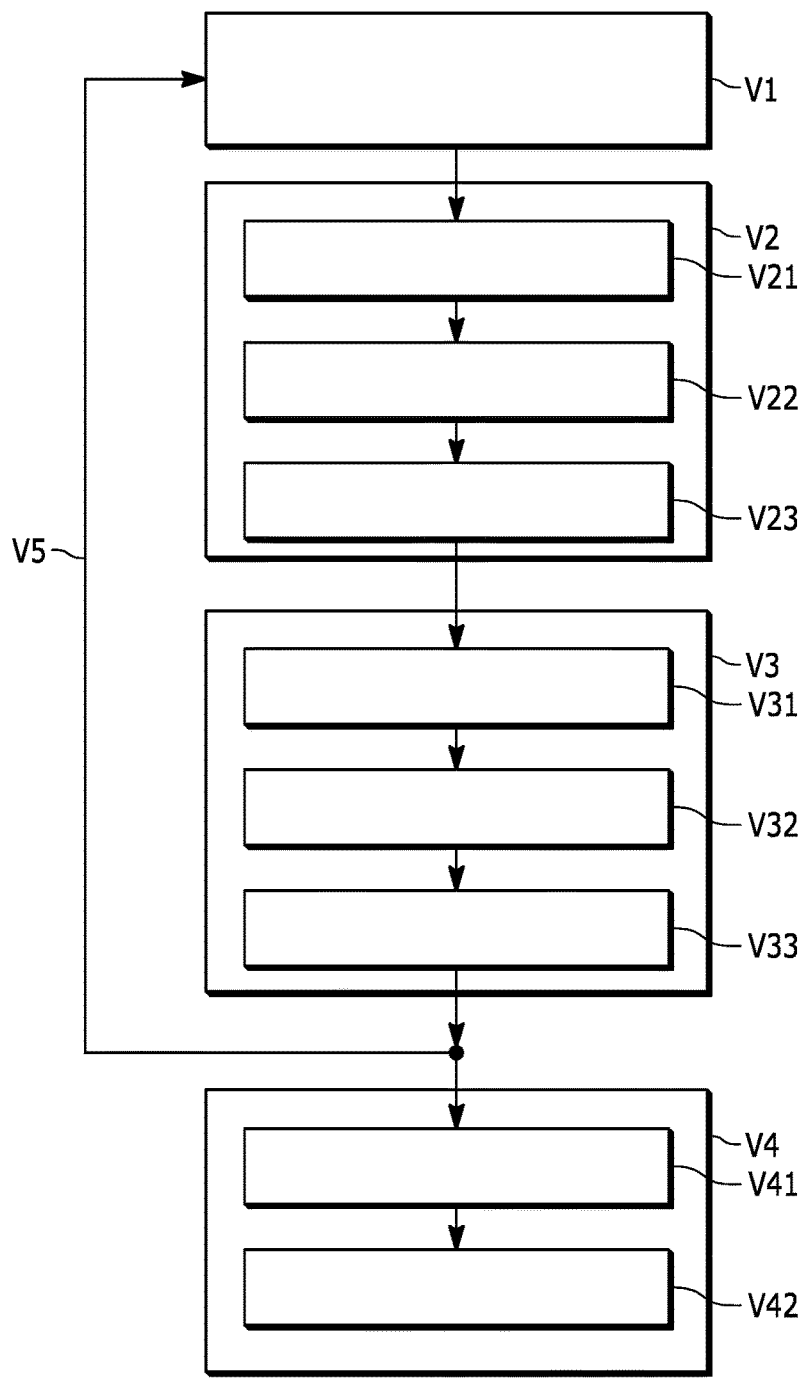
FIG. 3 shows a flowchart explaining a second example of the method for setting a slip threshold for a vehicle movement dynamics control device.

FIG. 3 shows a flowchart explaining another example of the method. For this method according to the disclosure it will be assumed that the braking slip is positive.

In the first step V1 a general slip threshold S_0 is also predefined here again. This slip threshold S_0 is defined in such a way that it is used for conventional operation in which, that is to say, no geometric slip is present, for example in the case of a braking process or in the case of straight-ahead travel. This slip threshold S_0 can usually be selected to be relatively low since wheel slip should generally not occur in the conventional driving mode. In this state, the vehicle movement dynamics control device should be configured in a very sensitive fashion and engage directly in the anti-lock brake control if the wheels tend to lock.

In the next step V2, wheel-specific minimum slip values are determined for the respective wheels of the motor vehicle. For this purpose, in a substep V21 the corresponding wheel speeds are determined—directly or indirectly by means of wheel rotations—for all the wheels 11 of the motor vehicle by means of the respective wheel sensors. It is assumed that the respectively highest determined wheel speed then forms the reference speed. The reference speed can, however, also be calculated by means of a more or less complex algorithm. In the substep V22, the wheel-specific slip signals S_FL, S_FR, S_RL, S_RR are formed from the difference between this reference speed and the measured wheel speeds. The assigned installation positions of the wheels are respectively denoted here and below by FL, FR, RL, RR.

During the driving mode and, in particular, during the ABS control, the slip at each wheel fluctuates continuously, and in connection with this the corresponding wheel-specific slip signals S_FL, S_FR, S_RL, S_RR fluctuate continuously. In order then to be able to determine at all the presence of geometric slip, it is necessary to use the non-compensated slip as a reference. This non-compensated slip is present if a minimum slip is occurring. Therefore, only situations with very low slip can be used for the evaluation as to whether therefore geometric slip is present at a wheel or not. Various methods are possible for the determination of these so-called wheel-specific minimum slip values Smin_FL, Smin_FR, Smin_RL, Smin_RR in the substep V23.

In a first variant, for example a drag pointer can be used to determine the wheel-specific minimum slip values Smin_FL, Smin_FR, Smin_RL, Smin_RR. This drag pointer must be continuously reset.

An alternative and advantageous variant provides for the use of a chronologically asymmetrical low-pass filter which does not exhibit a filtering effect if Si<Smin_i (for i=FL, FR, RL, RR). A high filtering effect is provided for Si≥_Smin_i. In contrast to the use of the drag pointer just described, this filter solution avoids the problem of re-initialization of the drag pointer. In addition, there is the possibility here of adapting the filter constant of the chronologically asymmetrical low-pass filter to the respective driving situation when configuring the filter. For example, the filtering effect could be amplified if the current slip is a dynamic braking slip and therefore not geometric slip.

Subsequently in step V3 it is detected whether geometric slip is present or not. The detection of the geometric slip is carried out by correlating all the determined wheel-specific minimum slips values Smin_FL, Smin_FR, Smin_RL, Smin_RR with one another and subsequently evaluating the wheel-specific minimum slip values which are correlated with one another.

During this evaluation, it is taken into account, for example, that geometric slip always occurs simultaneously at a plurality of wheels, for example at the wheels on the inside of the bend (in the example in FIG. 1 these wheels are FL, RL). In addition, the geometric slip must be zero at least one wheel on the outside of the bend (in the example in FIG. 1 these are the wheels FR, RR) if the slip is compensated. In this way, in the substep V31 the plausibility of the determined minimum slip values Smin_FL, Smin_FR, Smin_RL, Smin_RR actually having been caused by geometric slip or by other effects is checked.

In the substep V32, in each case the lowest slip value is subtracted from the determined wheel-specific minimum slip values Smin_FL, Smin_FR, Smin_RL, Smin_RR, with the result that subsequently at least one of the determined wheel-specific minimum slip values Smin_FL, Smin_FR, Smin_RL, Smin_RR is equal to zero.

Then, in a substep V33 the wheel-specific minimum slip values Smin_left, Smin_right, Smin_front, Smin_rear are formed from the wheel-specific slip signals taking into account the individual axles (front, rear) and the individual sides of the vehicle (left, right). If geometric slip is then present, it must be present at both wheels of a side of the vehicle, i.e. both wheels of the same side of the vehicle must have one minimum slip value. This minimum slip value is represented by Smin_left or Smin_right. If one of the two values is greater than zero at least the assumption that this value is the geometric slip is justified.

Subsequently, in a substep V41 of the step V4 the slip thresholds of the wheels of this side of the vehicle can be selectively raised by a geometric slip offset. For example it is possible to provide:

Slip_Offset_FL=Slip_Offset_RL=Smin_left

Slip_Offset_FR=Slip_Offset_RR=Smin_right

Appropriately, in a further substep V42 the geometric slip offset values which are determined in this way are additionally limited to an upper offset threshold. This upper offset threshold is selected in such a way that it can actually occur in the real operation in the vehicle. This upper offset value can therefore be estimated on the assumption of a maximum lateral acceleration limit, for example the yaw rates which occur at the current vehicle velocity taking into account the curve radiuses which are possible in this context, and an upper limit for the geometric slip offset can be predetermined on the basis thereof.

For the detection of the presence of geometric slip in step V3, it is also possible to use an effect according to which during travel around a bend, in particular in the case of tight bends and low velocities, the wheel speed at the non-steered rear axle is lower than at the steered front axle. As a result, the minimum slip at the rear axle is higher than the minimum slip at the front axle, with the result that Smin_rear is higher than Smin_front. In this case, it can be provided that the geometric slip offset at the rear axle is increased by the difference Smin_rear, Smin_front or at least a portion thereof. This increase can also be limited here, for example as a function of the velocity.

As soon as it is detected in step V3 that there is no longer any geometric slip present, the method returns again to the step V1 via the branch V5, i.e. the predefined slip threshold which is relevant for the conventional operation is set again.

Although the present disclosure has been described above on the basis of the above examples, it is not restricted thereto but rather can be modified in a variety of ways. In particular, the disclosure has been explained above with reference to an anti-lock brake system which has been expanded with the function of the method according to the disclosure. Of course, the present disclosure can additionally or alternatively also be used advantageously in a traction control system (TCS).

What is claimed is:

1. A method for setting a slip threshold for a vehicle movement dynamics control device of a motor vehicle, the vehicle movement dynamics control device in communication with an anti-lock brake control, the method comprising:
predefining, at the vehicle movement dynamics control device, a slip threshold when the vehicle movement dynamics control device is activated to reduce a slip;
receiving, at the vehicle movement dynamics control device, a wheel speed from a rotational speed sensor associated with each one of the wheels of the motor vehicle;
determining, at the vehicle movement dynamics control device, a vehicle reference speed;
for each wheel:
determining, at the vehicle movement dynamics control device, wheel-specific slip signals based on the wheel speeds associated with the wheels and the vehicle reference speed; and
determining, at the vehicle movement dynamics control device, wheel-specific minimum slip values, the wheel-specific minimum slip values are based on the respective wheel-specific slip signals;

correlating, at the vehicle movement dynamics control device, the determined wheel-specific minimum slip values with one another;

evaluating, at the vehicle movement dynamics control device, the correlated wheel-specific minimum slip values;

determining, at the vehicle movement dynamics control device, a presence of a geometric slip based on the evaluation of the correlated wheel specific minimum slip values, the geometric slip indicative of the individual wheels rotating at different speeds as a result of their different curve radiuses along a curved vehicle path;

and when a geometric slip is detected, raising, at the vehicle movement dynamics control device, the slip threshold associated with each wheel causing the anti-lock brake control to trigger at the raised slip threshold.

2. The method of claim 1, wherein the case of the step of raising the slip threshold, the latter is raised individually for each wheel of the motor vehicle, in particular in accordance with the wheel-specific minimum slip value determined for the respective wheel.

3. The method of claim 1, wherein raising the slip threshold includes raising the slip threshold at least by the value of the determined wheel-specific minimum slip value.

4. The method of claim 1, wherein raising the slip threshold that does not exceed a maximum predefined slip value.

5. The method of claim 4, wherein the predefined maximum slip value is derived from a permissible lateral acceleration, a vehicle velocity, a velocity dependent maximum curve radius and/or a yaw rate.

6. The method of claim 1, wherein a wheel-specific slip signal is generated for a respective wheel of the motor vehicle by virtue of the fact that the difference between a reference speed and a measured current wheel speed for the respective wheel is continuously calculated.

7. The method of claim 1, wherein determining wheel-specific minimum slip values for a predefined time period a minimum signal value of the wheel-specific slip signal assigned to a respective wheel is determined and is used as a wheel-specific minimum slip value for this wheel.

8. The method of claim 1, wherein during the evaluation of the wheel-specific minimum slip values which are correlated with one another it is assumed that geometric slip always occurs simultaneously at a plurality of wheels of the motor vehicle, in particular at wheels on the same side of the vehicle.

9. The method of claim 1, wherein during the evaluation of the wheel-specific minimum slip values which are correlated with one another it is assumed that the wheel-specific geometric slip is approximately zero at least one wheel, in particular at a wheel on the respective other side of the vehicle.

10. The method of claim 1, wherein during the evaluation of the wheel-specific minimum slip values which are correlated with one another it is assumed that in the case of geometric slip the wheel-specific minimum slip value of a rear-axle wheel is higher than the wheel-specific minimum slip value of a respective front-axle wheel on the same side of the vehicle.

11. The method of claim 1, wherein the method is used at low vehicle velocities.

12. The method of claim 1, wherein determining wheel-specific minimum slip values for the wheels of the motor vehicle, detecting a geometric slip, and raising the slip threshold are used in the case of positive braking slip and/or travel around a bend.

13. The method of claim 1, wherein the predefined slip threshold is set anew as soon as the conditions for determined geometric slip no longer apply.

14. A vehicle movement dynamics control device supported by a motor vehicle which has a plurality of wheels which can be controlled individually, having a brake slip control apparatus, the vehicle movement dynamic control device configured to set a slip thresholds by:

predefining a slip threshold when the vehicle movement dynamics control device is activated to reduce a slip;

receiving a wheel speed from a rotational speed sensor associated with each one of the wheels of the motor vehicle;

determining a vehicle reference speed;

for each wheel:
determining wheel-specific slip signals based on the wheel speeds associated with the wheels and the vehicle reference speed; and
determining wheel-specific minimum slip values based on the respective wheel-specific slip signals;

correlating the determined wheel-specific minimum slip values with one another;

evaluating the correlated wheel-specific minimum slip values;

determining a presence of a geometric slip based on the evaluation of the correlated wheel specific minimum slip values, the geometric slip indicative of the individual wheels rotating at different speeds as a result of their different curve radiuses along a curved vehicle path;

and when a geometric slip is detected, raising the slip threshold associated with each wheel causing the anti-lock brake control to trigger at the raised slip threshold.

15. The vehicle movement dynamics control device of claim 14, wherein the vehicle movement dynamics control device is a component of an ABS device or of a traction control device.

* * * * *